(12) United States Patent  (10) Patent No.: US 9,150,271 B1
Liu  (45) Date of Patent: Oct. 6, 2015

(54) BIKE STROLLER

(71) Applicant: Cheh-Kang Liu, Taipei (TW)

(72) Inventor: Cheh-Kang Liu, Taipei (TW)

(*) Notice: Subject to any disclaimer, the term of this patent is extended or adjusted under 35 U.S.C. 154(b) by 0 days.

(21) Appl. No.: 14/518,025

(22) Filed: Oct. 20, 2014

(51) Int. Cl.
*B62K 5/05* (2013.01)
*B62K 27/10* (2006.01)
*B62K 5/06* (2006.01)

(52) U.S. Cl.
CPC ... *B62K 5/05* (2013.01); *B62K 5/06* (2013.01); *B62K 27/10* (2013.01)

(58) Field of Classification Search
CPC ............ B62K 5/02; B62K 5/05; B62K 5/023; B62K 5/06; B62K 9/02
USPC ........................................................ 280/282
See application file for complete search history.

(56) References Cited

U.S. PATENT DOCUMENTS

| | | | | |
|---|---|---|---|---|
| 1,427,417 A | * | 8/1922 | Rickey | 280/202 |
| 1,661,257 A | * | 3/1928 | Kirch | 280/202 |
| 4,770,431 A | * | 9/1988 | Kulik | 280/202 |
| 4,789,175 A | * | 12/1988 | Schramm | 280/304.1 |
| 4,863,183 A | * | 9/1989 | Hwang et al. | 280/267 |
| 4,917,396 A | * | 4/1990 | Meneses et al. | 280/267 |
| 7,780,184 B2 | * | 8/2010 | Ehrenreich et al. | 280/648 |
| 7,992,889 B2 | * | 8/2011 | Ehrenreich et al. | 280/648 |
| 8,118,322 B2 | * | 2/2012 | Barak et al. | 280/287 |
| 8,632,088 B2 | * | 1/2014 | Yerdon | 280/221 |

* cited by examiner

*Primary Examiner* — Kevin Hurley
(74) *Attorney, Agent, or Firm* — Jackson IPG PLLC; Demian K. Jackson

(57) ABSTRACT

A bike stroller includes a front bike stroller frame equipped with two front wheels and providing a connecting tube, a handlebar fastened to the front bike stroller frame, a rear bike stroller frame equipped with a rear wheel and providing a connecting tube and adjustably connected to the front bike stroller frame between a first position for enabling the bike stroller to be used for riding and a second position for enabling the bike stroller to be used as a baby stroller, a seat post frame selectively and detachably fastenable to the connecting tube of the front bike stroller frame or rear bike stroller frame, and a bicycle saddle selectively and detachably fastenable to the connecting tube of the front bike stroller frame or rear bike stroller frame.

1 Claim, 7 Drawing Sheets

BIKE STROLLER

BACKGROUND OF THE INVENTION

1. Field of the Invention

The present invention relates to bicycle technology and more particularly, to a bike stroller, which can be selectively arranged in a first form for riding, or a second form for use as a baby stroller.

2. Description of the Related Art

U.S. Pat. No. 8,118,322B2 discloses a cycling apparatus that is constructed as a tricycle with a contractible and extendable wheel base, which can carry a child and/or a shopping basket, and which can be converted into a standard-size stroller or a standard-size shopping cart, and be steered like a standard stroller or a standard shopping cart. According to this design, it is inconvenient to change the cycling apparatus between a standard-size stroller and a standard-size shopping car. Further, the front-to-back length of this cycling apparatus is not adjustable. If the cycling apparatus is converted into a standard-size stroller for riding and carrying a baby, the user cannot pedal the cycling apparatus comfortably.

SUMMARY OF THE INVENTION

The present invention has been accomplished under the circumstances in view. It is the main object of the present invention to provide a bike stroller, which allows adjustment of the combined length of the front bike stroller frame and rear bike stroller frame thereof and fastening or not fastening the seat post frame to the rear bike stroller frame, enabling the bike stroller to carry a baby while riding, or for use as a baby stroller.

It is another object of the present invention to provide a bike stroller, which facilitates adjustment of the combined length of the front bike stroller frame and the rear bike stroller frame and assures riding comfort.

It is still another object of the present invention to provide a bike stroller, which assures a high level of connection stability after adjustment of the combined length of the front bike stroller frame and the rear bike stroller frame.

DETAILED DESCRIPTION OF THE INVENTION

Figure 1:
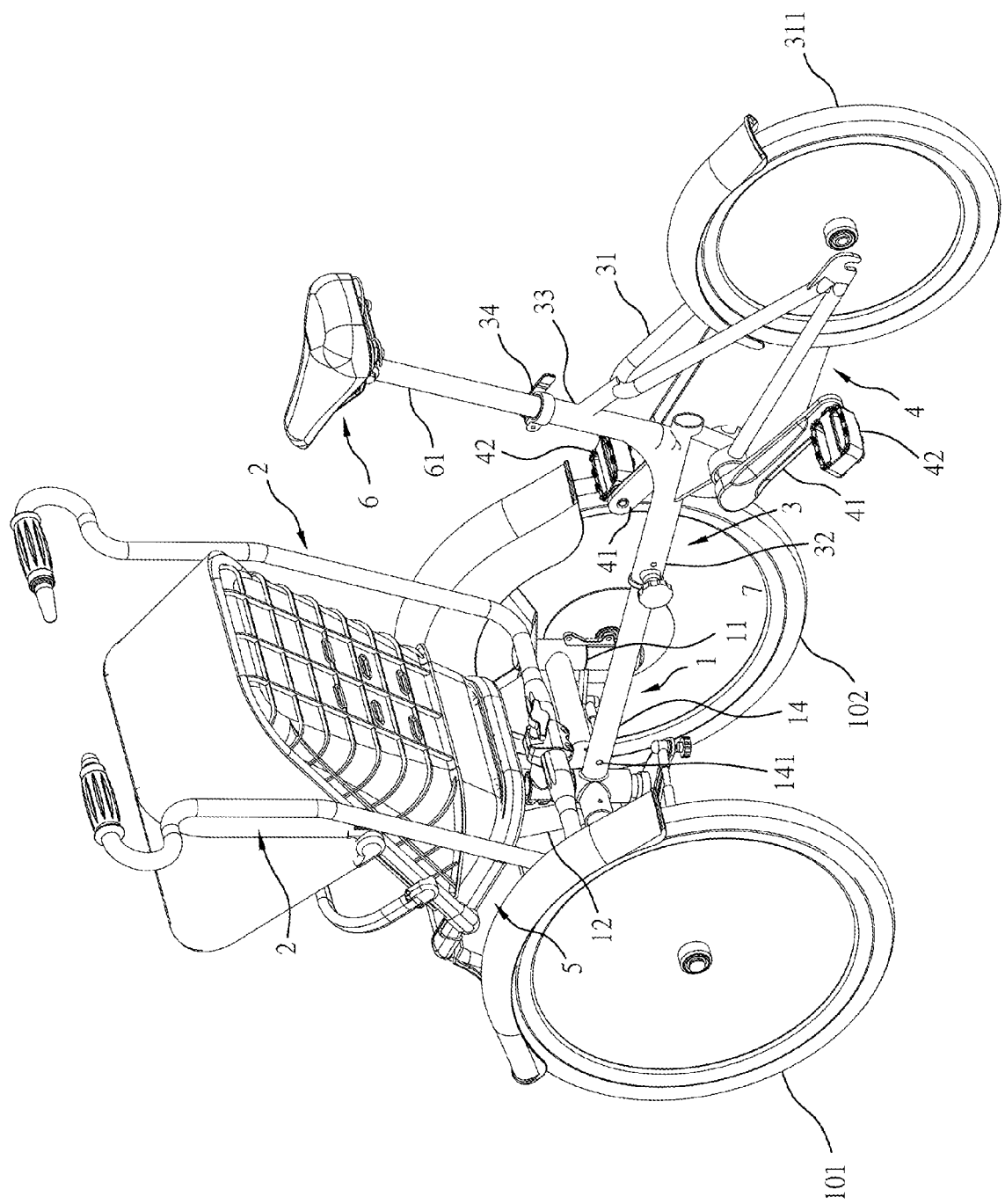
FIG. 1 is an oblique top elevational view of a bike stroller in accordance with the present invention.

Referring to FIGS. 1-7, a bike stroller in accordance with the present invention is shown. The bike stroller comprises:

a front bike stroller frame 1 (see FIG. 1 and FIG. 4) comprising two wheel brackets 11 respectively located at opposing left and right sides thereof in a parallel relationship, a left front wheel 101 and a right front wheel 102 respectively pivotally mounted at the wheel brackets 11, a connecting tube 12 located at a top side thereof, a first seat post clamp 13 (or other quick release means) provided at the connecting tube 12 for securing a bicycle saddle 6 (see FIG. 1) or seat post frame 5 (see FIG. 5) to the connecting tube 12, and a rear tube 14 horizontally located at a rear side thereof for the connection of a rear bike stroller frame 3 and having a front screw hole 141 (see FIG. 1 and FIG. 4) transversely disposed near a front end thereof and a rear screw hole 142 transversely disposed near an opposing rear end thereof for the mounting of a locking member 7 to detachably lock the rear tube 14 to a rear bike stroller frame 3;

at least one handlebar 2 fastened to the front bike stroller frame 1;

a rear bike stroller frame 3 comprising a rear wheel fork 31 supporting a rear wheel 311, a connecting tube 33 located at a top side thereof, a second seat post clamp 34 (or other quick release means) provided at the connecting tube 33 for securing a bicycle saddle 6 (see FIG. 1) or seat post frame 5 (see FIG. 5) to the connecting tube 33, and a front tube 32 located at a front side thereof and detachably attached onto the rear tube 14 of the front bike stroller frame 1 and having a front screw hole 321 disposed near a front end thereof and selectively fastened to the front screw hole 141 or rear screw hole 142 in the rear tube 14 of the front bike stroller frame 1 by the locking member 7;

a pedal transmission mechanism 4 mounted in the rear bike stroller frame 3 and comprising two cranks 41 symmetrically arranged at two opposite sides and a pedal 42 mounted on each crank 41 for pedaling by a user to rotate the respective crank 41;

a seat post frame 5 adapted for supporting a baby seat and having a seat post 51 located at a bottom side thereof and selectively and detachably fastenable to the connecting tube 12 of the front bike stroller frame 1 or the connecting tube 33 of the rear bike stroller frame 3; and a bicycle saddle 6 adapted for the sitting of a user and having a seat post 61 located at a bottom side thereof and selectively and detachably fastenable to the connecting tube 12 of the front bike stroller frame 1 or the connecting tube 33 of the rear bike stroller frame 3.

Figure 2:
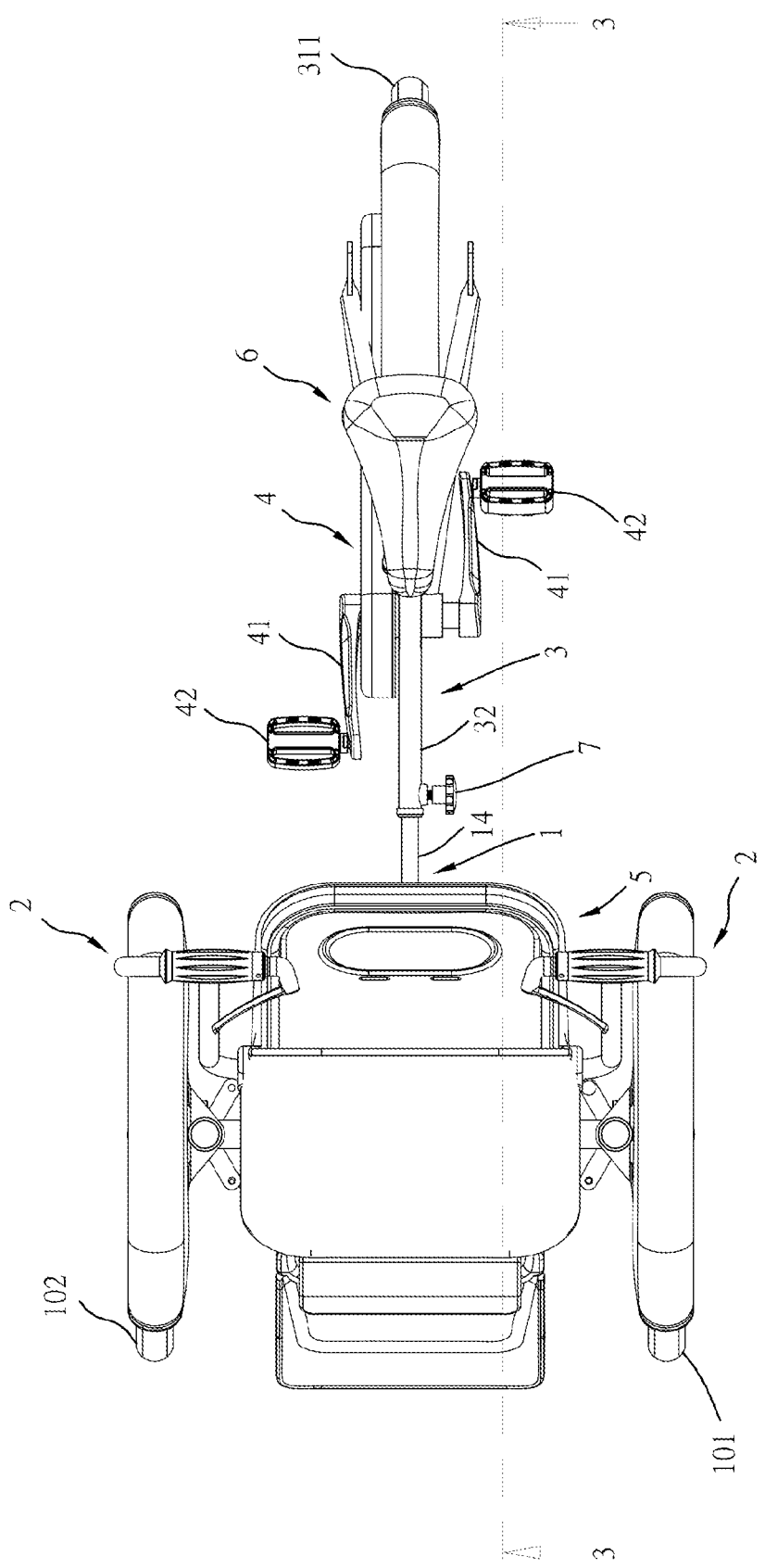
FIG. 2 is a top view of the bike stroller in accordance with the present invention.
Figure 3:
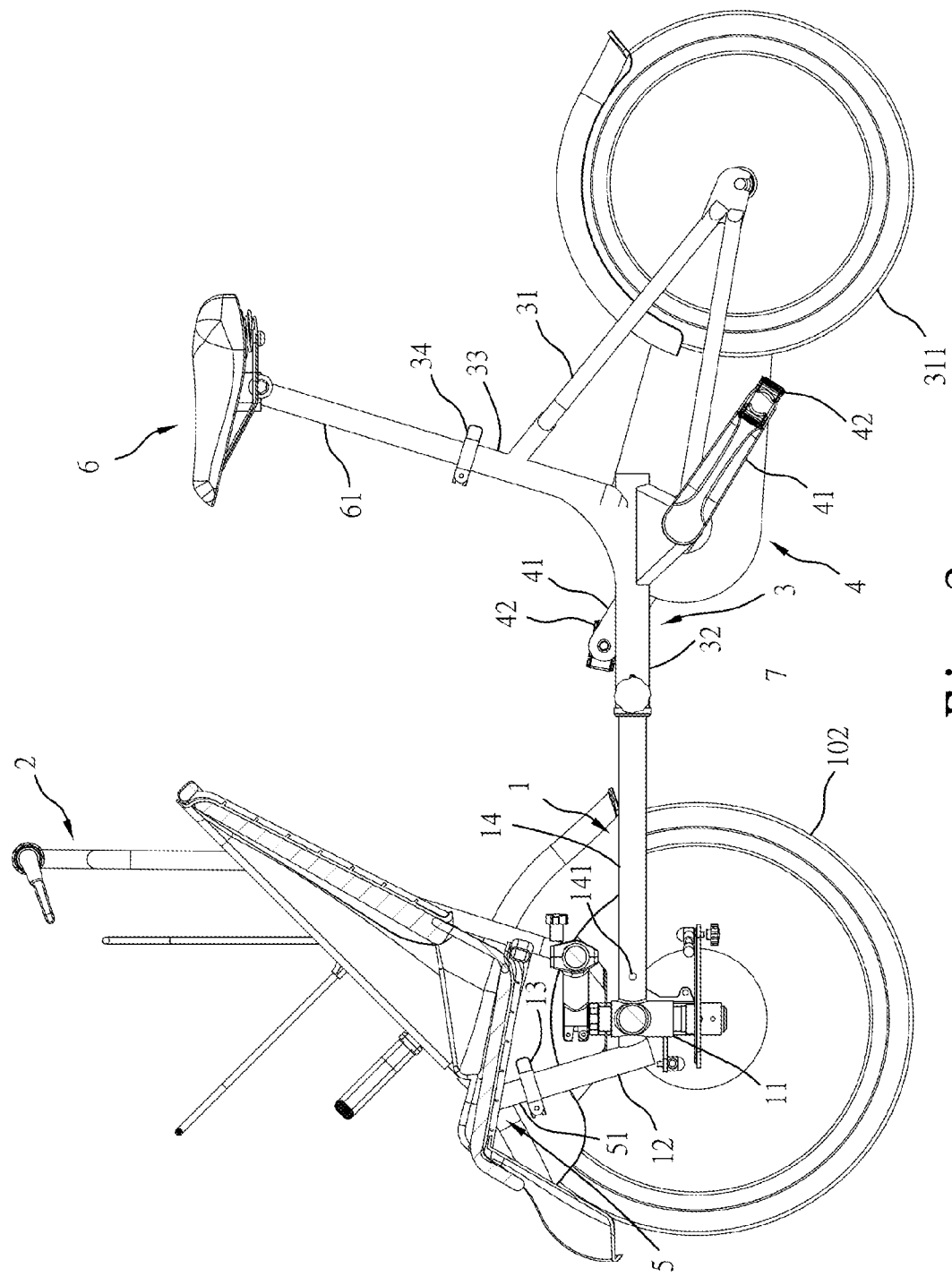
FIG. 3 is a sectional view taken along line 3-3 of FIG. 2.
Figure 4:
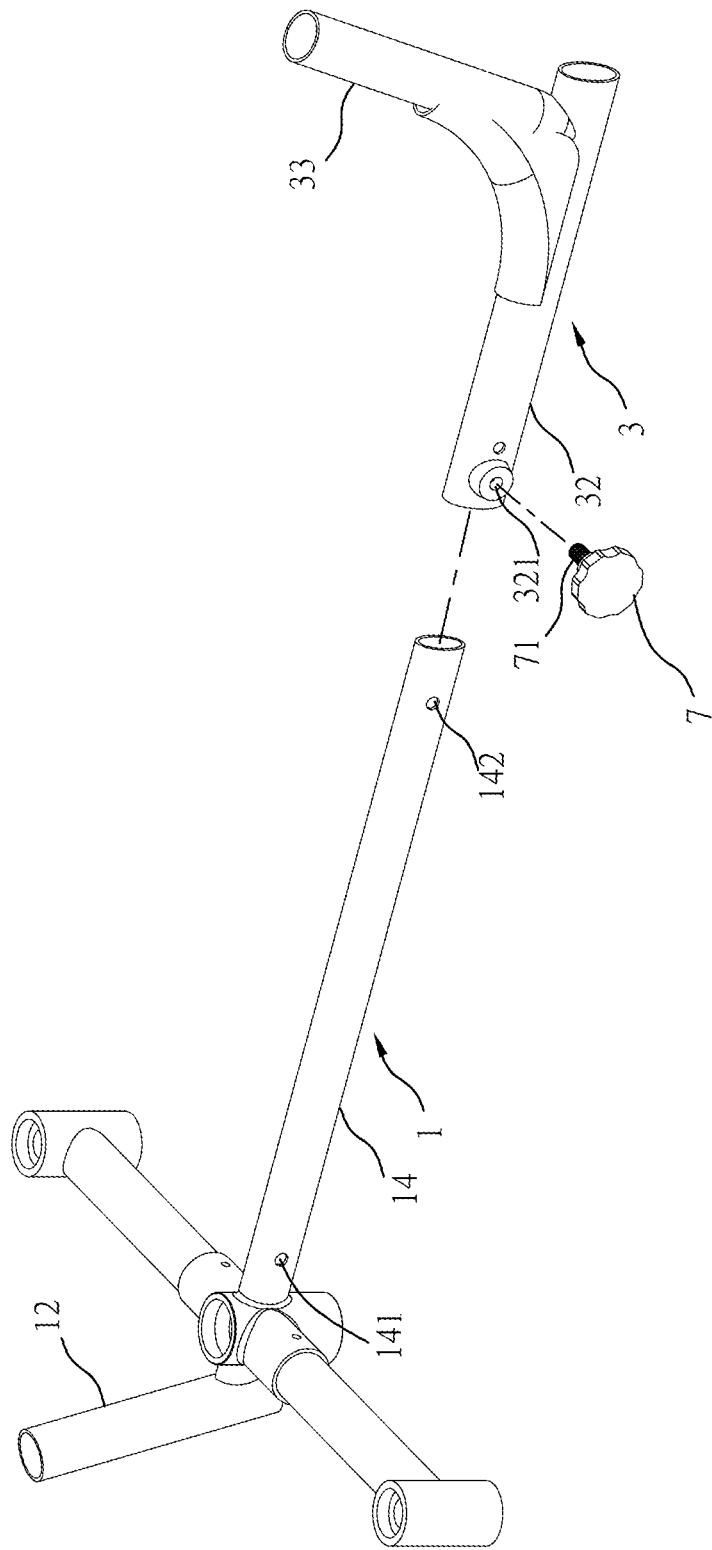
FIG. 4 is an enlarged exploded view of a part of the present invention, illustrating the arrangement of the front bike stroller frame, locking member and rear bike stroller.

Thus, the front screw hole 321 of the front tube 32 of the rear bike stroller frame 3 can be locked to the rear screw hole 142 of the rear tube 14 of the front bike stroller frame 1 by the locking member 7 (see FIGS. 1-3). At this time, the combined length of the front bike stroller frame 1 and the rear bike stroller frame 3 is relatively longer, and the user can ride the bike stroller and carry a baby in a baby seat that is supported on the seat post frame 5. Further, the user can unlock the locking member 7 from the front screw hole 321 of the front tube 32 of the rear bike stroller frame 3 and the rear screw hole 142 of the rear tube 14 of the front bike stroller frame 1, and then push the front tube 32 of the rear bike stroller frame 3 forwards relative to the front bike stroller frame 1, and then use the locking member 7 to lock the front screw hole 321 of the front tube 32 of the rear bike stroller frame 3 and the front screw hole 141 of the rear tube 14 of the front bike stroller frame 1. At this time, the combined length of the front bike stroller frame 1 and the rear bike stroller frame 3 is minimized, and the user can then loosen the first seat post clamp 13 and the second seat post clamp 34 and then fasten the seat post 51 of the seat post frame 5 to the connecting tube 33 of the rear bike stroller frame 3 and the seat post 61 of the bicycle saddle 6 to the connecting tube 12 of the front bike stroller frame 1, enabling the bike stroller to be used as a baby stroller (see FIGS. 5-7).

Figure 5:
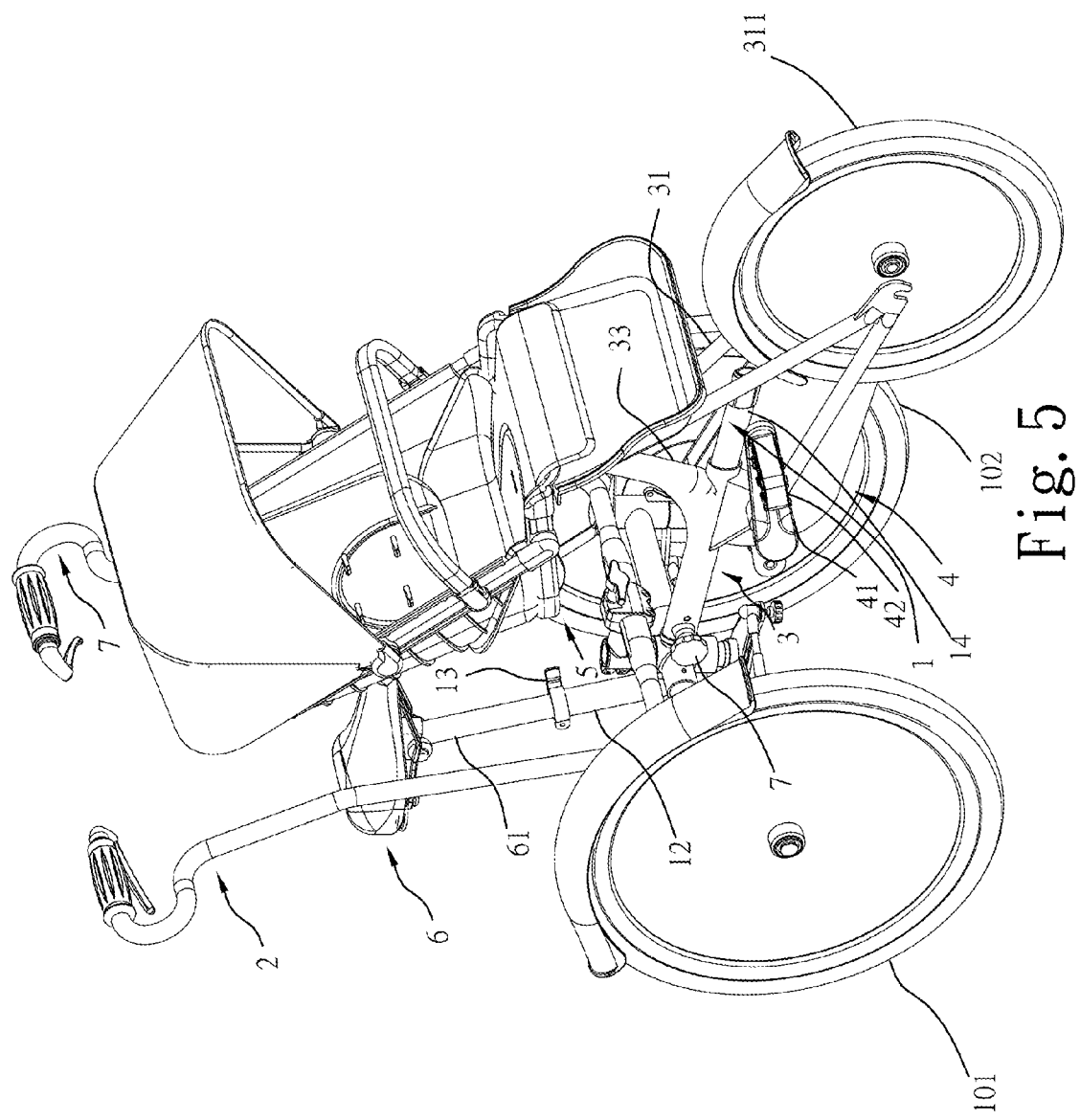
FIG. 5 is an elevational view of the present invention, illustrating the bike stroller arranged in the form of a baby stroller.
Figure 6:
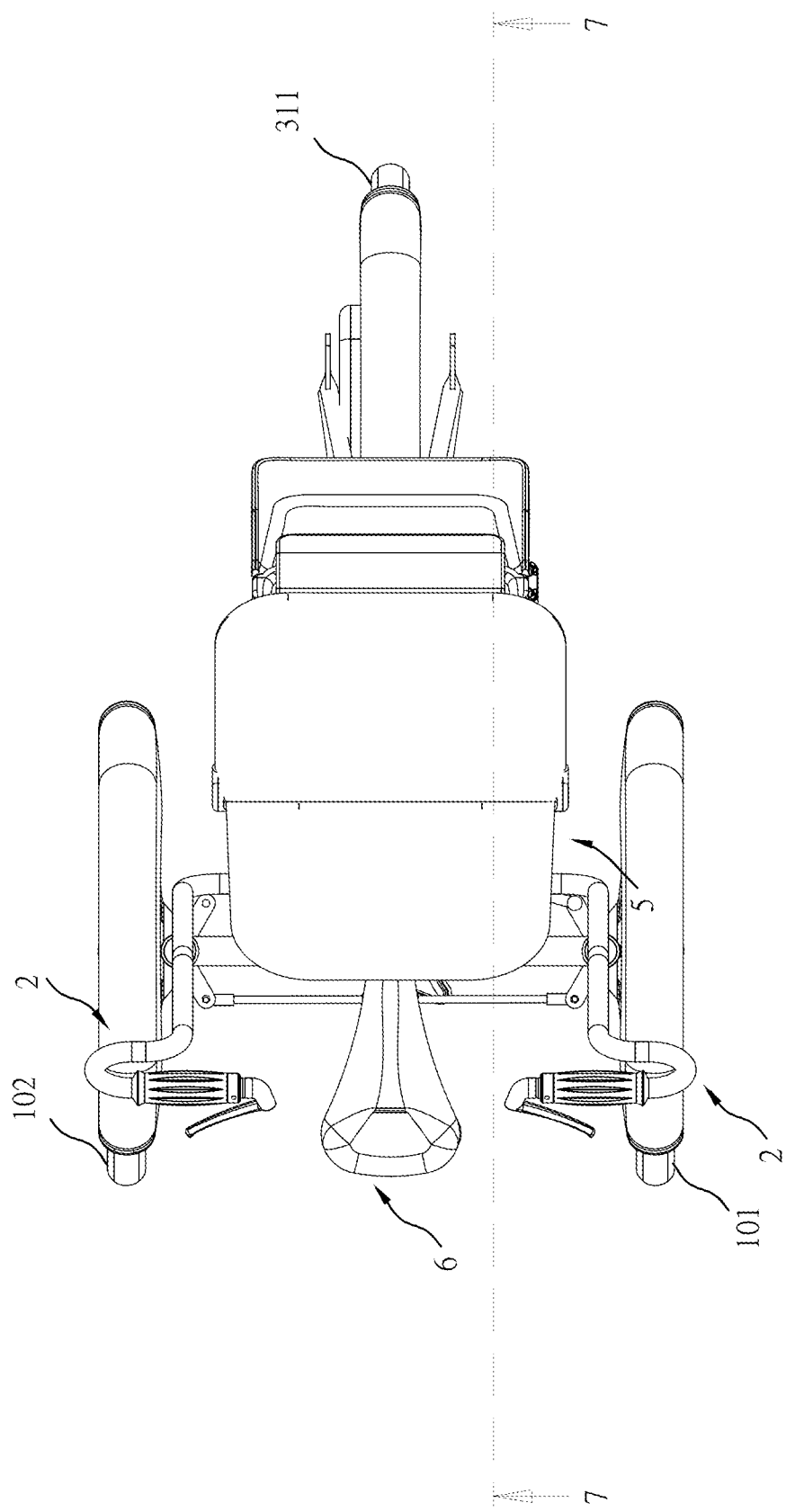
FIG. 6 is a top view of FIG. 5.
Figure 7:
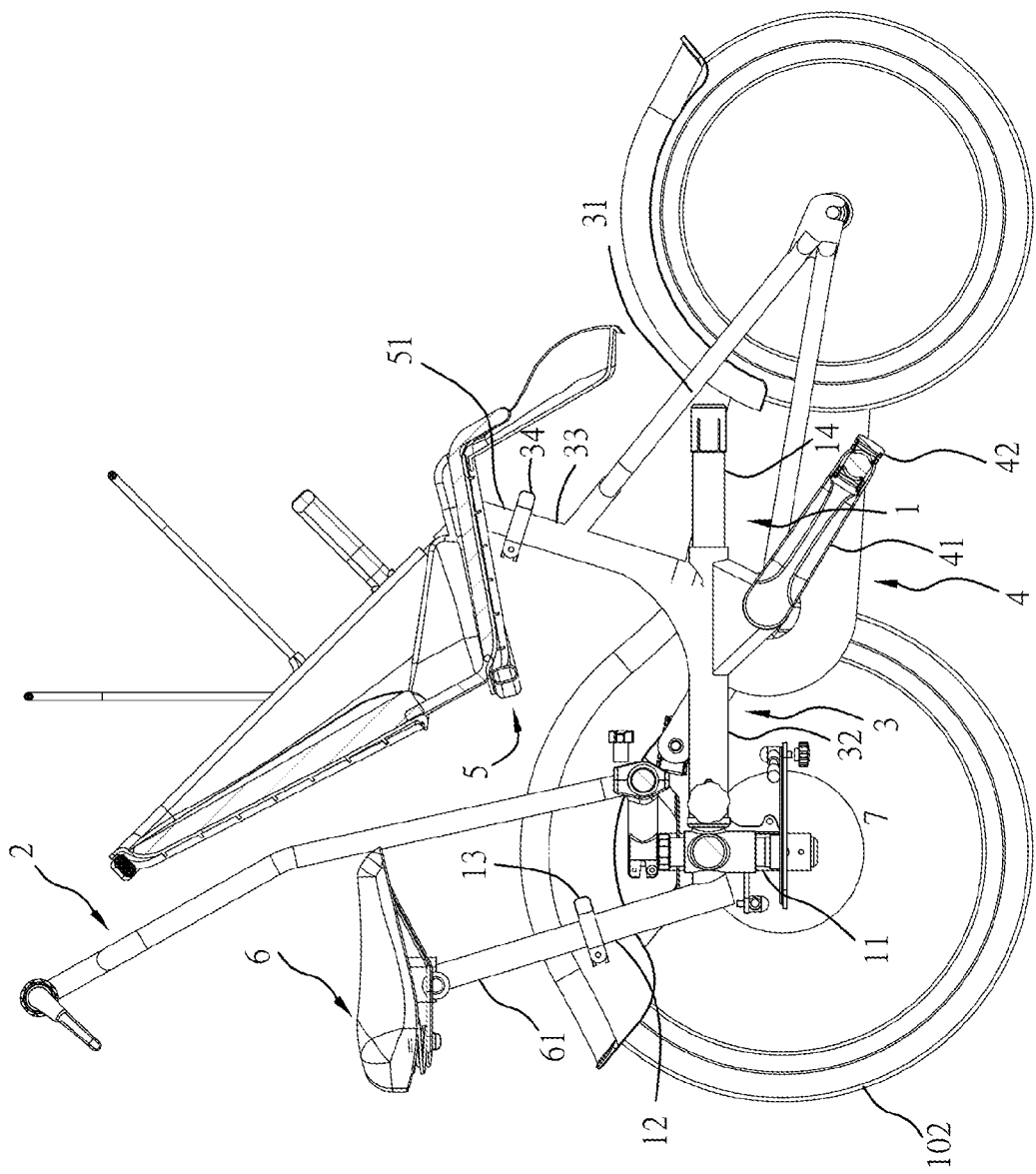
FIG. 7 is a sectional view taken along line 7-7 of FIG. 6.

Thus, by means of adjusting the combined length of the front bike stroller frame 1 and the rear bike stroller frame 3 and fastening or not fastening the seat post frame 5 to the rear bike stroller frame 3, the bike stroller can be alternatively arranged in one of two forms for riding and carrying a baby, (see FIGS. 1-3) or for use as a baby stroller (see FIGS. 5-7). Further, the locking member 7 in this embodiment is a lock screw comprising a threaded stem 71 (see FIG. 4) for threading into the front screw hole 141 or rear screw hole 142 of the rear tube 14 of the front bike stroller frame 1 and the front screw hole 321 of the front tube 32 of the rear bike stroller frame 3 to positively lock the front bike stroller frame 1 and the rear bike stroller frame 3 together.

What is claimed is:

1. A bike stroller, comprising:
    a front bike stroller frame comprising two wheel brackets respectively located at opposing left and right sides thereof in a parallel manner, a left front wheel and a right front wheel respectively pivotally mounted at said wheel brackets, a connecting tube located at a top side thereof provided with a first seat post clamp for selectively securing a bicycle saddle or seat post frame, and a rear tube horizontally located at a rear side thereof for the connection of a rear bike stroller frame, said rear tube comprising a front screw hole transversely disposed near a front end thereof and a rear screw hole transversely disposed near an opposing rear end thereof;
    at least one handlebar fastened to said front bike stroller frame;
    a rear bike stroller frame comprising a rear wheel fork supporting a rear wheel, a connecting tube located at a top side thereof and provided with a second seat post clamp for selectively securing a bicycle saddle or seat post frame, and a front tube located at a front side thereof and detachably attached onto said rear tube of said front bike stroller frame, said front tube comprising a front screw hole disposed near a front end thereof and selectively fastened to the front screw hole or rear screw hole in said rear tube of said front bike stroller frame;
    a locking member adapted for selectively locking the front screw hole of said front tube to the front screw hole or rear screw hole in said rear tube of said front bike stroller frame;
    a pedal transmission mechanism mounted in said rear bike stroller frame, said pedal transmission mechanism comprising two cranks symmetrically arranged at two opposite sides and a pedal mounted on each said crank for pedaling by a user to rotate the respective said crank;
    a seat post frame adapted for supporting a baby seat, said seat post frame comprising a seat post located at a bottom side thereof and selectively and detachably fastenable to the connecting tube of said front bike stroller frame or the connecting tube of said rear bike stroller frame; and
    a bicycle saddle adapted for the sitting of a user, said bicycle saddle comprising a seat post located at a bottom side thereof and selectively and detachably fastenable to the connecting tube of said front bike stroller frame or the connecting tube of said rear bike stroller frame.

* * * * *